United States Patent [19]

Suzuki

[11] Patent Number: 4,831,609
[45] Date of Patent: May 16, 1989

[54] TRACKING METHOD AND APPARATUS FOR OPTICAL RECORDING MEDIUM

[75] Inventor: Hidefumi Suzuki, Tokyo, Japan

[73] Assignee: CSK Corporation, Tokyo, Japan

[21] Appl. No.: 111,437

[22] Filed: Oct. 21, 1987

[30] Foreign Application Priority Data

Oct. 21, 1986 [JP] Japan .................................. 61-250248

[51] Int. Cl.⁴ .............................................. G11B 7/00
[52] U.S. Cl. ........................................ 369/44; 369/99; 369/124
[58] Field of Search ...................... 360/76, 77; 369/44, 369/45, 46, 47, 93, 95, 99, 100, 111, 124, 275

[56] References Cited

U.S. PATENT DOCUMENTS

| | | | |
|---|---|---|---|
| 4,290,122 | 9/1981 | Bates et al. | 365/234 |
| 4,325,135 | 4/1982 | Dil et al. | 369/110 |
| 4,443,870 | 4/1984 | Hazel et al. | 369/44 |
| 4,598,393 | 7/1986 | Pierce et al. | 369/46 |
| 4,674,081 | 6/1987 | Gerard et al. | 369/275 |
| 4,707,816 | 11/1987 | Yonezawa et al. | 369/44 |

Primary Examiner—Frank Gonzalez
Attorney, Agent, or Firm—Lowe, Price, LeBlanc, Becker & Shur

[57] ABSTRACT

A tracking method for reading/writing data with respect to an optical recording medium having clock tracks each formed of clock bits of optical patterns and data tracks. The method is carried out by irradiating from an optical lead side a pair of light beams onto a pair of clock tracks, with the beams so deviated from each other in a direction of relative movement of the optical head with respect to the medium that beam detection signals may have a difference in phase therebetween. Reflections of the respective light beams from the clock tracks are detected and a difference signal between reflections determined from the detection signals is obtained. A tracking-error signal from the difference signal is extracted and a zero-crossing point of the difference signal then is detected to extract a clock signal.

10 Claims, 3 Drawing Sheets

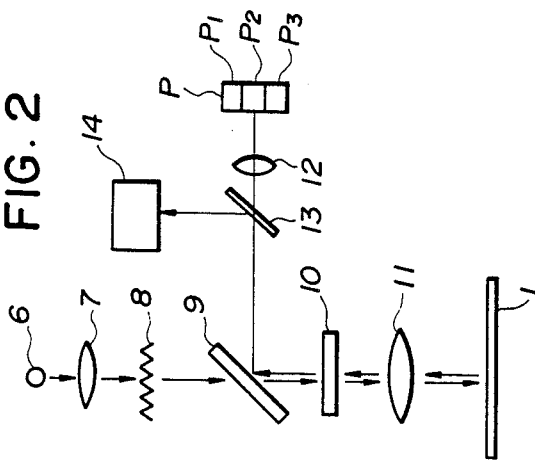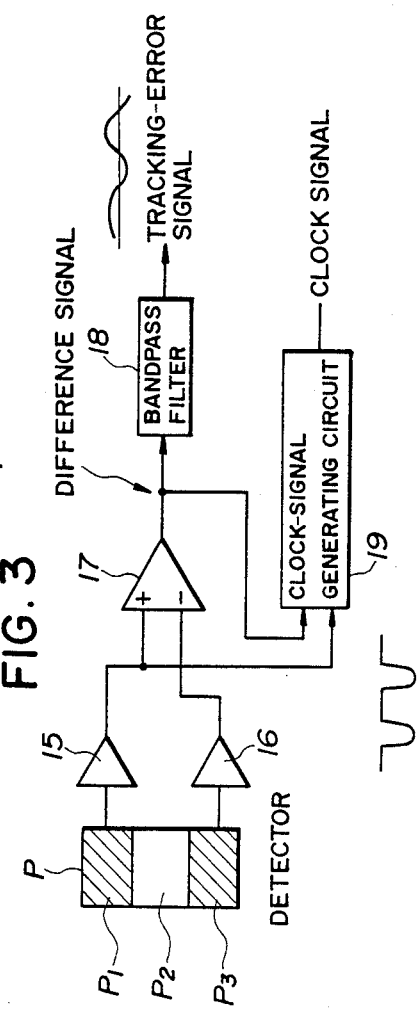

TRACKING METHOD AND APPARATUS FOR OPTICAL RECORDING MEDIUM

FIELD OF THE INVENTION

This invention relates to a tracking method and apparatus for an optical recording medium which has clock tracks each formed of a row of clock bits and data tracks provided in regions defined between any two adjacent clock tracks.

RELATED ARTS

Recently, optical recording media which store data in the digital form by forming optically changed patterns such as light-and-dark pits etc. have been proposed and have become a center of attraction. As the optical recording media can store data at a high density within a limited area, they can provide a memory of large storage capacity Hence, the optical recording media have been provided not only in the form of a disc but also in the form of a card, such as a magnetic recording card.

In this connection, it is to be noted that the positioning of the medium relative to an optical head should be accurate in the data reading/writing operation for the optical recording medium. More particularly, it is essential in the optical recording medium that the tracking and the reading/writing timing be set accurately.

For this purpose, tracking bands are provided in parallel with data tracks in some media and a relative skew of an optical head in the width direction of the tracking bands is detected to obtain a tracking error to attain the tracking by a servo system.

The setting of the reading/writing timing is heretofore attained as follows clock tracks each formed of clock bits are provided in parallel with the tracking bands and the clock bits of the clock tracks are detected by a special detector to obtain clock signals for providing reading/writing timing. Alternatively data is written so that clock signals may be incorporated into signals to be written, for example, according to FM encoding system.

However, the conventional system in which both the tracking bands and the clock tracks are provided has such a disadvantage that the data storage capacity is reduced. This disadvantage is especially serious for a card-type optical recording medium which has only a limited storage region.

On the other hand, the other conventional system in which clock signals are incorporated in the written signals themselves has such a problem that both the circuits on the transmitting side and the receiving side should inevitably be complicated, rendering the writing and the reading apparatuses expensive, thereby preventing widespread use the system.

SUMMARY OF THE INVENTION

The present invention has been made to obviate the problems as described above, and it is an object of the present invention to provide a tracking method and process for an optical recording medium, in which an optical head is relatively moved while tracing a clock track to effect tracking as well as extraction of clock signals for setting reading/writing timing, without incorporating clocks into signals themselves or reducing the storage capacity.

This invention, therefore, features a tracking method for reading/writing data with respect to an optical recording medium having clock tracks each formed of clock bit of optical patterns and data tracks, which method comprises:

irradiating a pair of light beams onto a pair of clock tracks, between which a data track to be written/read is positioned, from an optical head side, with the beams so deviated from each other in a direction of relative movement of the optical head with respect to the medium that beam detection signals may have a difference in phase therebetween;

detecting reflections of the respective light beams from the clock tracks;

obtaining a difference signal between said reflections from the detection signals;

extracting a tracking-error signal from the difference signal; and detecting a zero-crossing point of the difference signal to extract a clock signal.

The present invention further features a tracking apparatus for reading/writing data with respect to an optical recording medium having clock tracks each formed of clock bits of optical patterns and data tracks, which apparatus comprises:

an optical head including an optical system for irradiating a pair of light beams onto a pair of clock tracks, between which a data track to be written/read is positioned, from an optical head side, with the beams so deviated from each other in a direction of a relative movement of the optical head with respect to the medium that beam detection signals may have a difference in phase therebetween and detecting reflections of the respective light beams from the clock tracks; and a photodetector for converting the reflections into electric signals to obtain the detection signals;

a difference signal detecting circuit for obtaining a difference signal between said reflections from the detection signals;

a tracking-error signal extracting circuit for extracting a tracking-error signal from the difference signal; and a clock-signal extracting signal which detects a zero-crossing point of the difference signal to extract a clock signal.

In the present invention, preferably three light beams may be provided, one for data reading/writing and the other for tracking.

The light beams may preferably comprise one light beam for reading/writing data and a pair of light beams for tracking.

The deviation of said pair of light beams in the relative movement direction is achieved, for example, by irradiating the light beams in such a manner that a line connecting the centers of the pair of light beams may be at an angle with respect to a line connecting the pair of clock bits, thereby to generate a difference in phase between the detection signals.

The tracking is carried out, for example, by obtaining a difference in light amounts of the reflections from the pair of clock bits on which said pair of light beams are irradiated and by adjusting a relative positional relationship between the optical head and the optical recording medium to make the difference zero for correcting a tracking error.

The detection of the difference signal is carried out, for example, by a difference signal detecting circuit which comprises a differential amplifier.

The clock signal generating circuit comprises a zero-crossing detector for detecting a zero-crossing point from the difference signal; a pulse shaping circuit for shaping a clock pulse by using a zero-crossing point detection signal as a trigger; a gate signal shaping circuit for shaping a gate signal from either one of the detection signals corresponding to said pair of light beams which are output from the photodetectors; and an AND gate circuit through which AND of the clock pulse and the gate signal is obtained. The pulse shaping circuit may, for example, be a monostable multivibrator and the gate signal shaping circuit may, for example, be a Schmitt circuit.

OPERATION

With the arrangement as described above, the present invention features, in a tracking method for reading/writing data with respect to an optical recording medium having clock tracks each formed of clock bits of optical patterns and data tracks in that a pair of light beams are irradiated onto a pair of clock tracks, between which a data track to be written is positioned, from an optical head side, and reflections of the pair of light beams from the clock tracks are detected. Thus, waveform signals are obtained corresponding to presence or absence of the clock bit for the respective light beams. At this time, the beams are irradiated so that they are deviated from each other in a direction of the relative movement of the optical head with respect to the medium. The waveforms thereby obtained have a difference in phase therebetween.

The so obtained detection signals are, for example, subjected to differential amplification to obtain a difference signal. This difference signal is a signal from a discontinuous clock bit arranged periodically and contains a frequency component based hereon. This frequency component is eliminated to extract a tracking-error signal from the difference signal. The extraction of the tracking-error signal may be attained by various methods. For example, an average level variation component is taken out and extracted from the difference signal as a tracking-error signal.

In this connection, i is to be noted that the difference signal is not always zero and it fluctuates around zero, because there is a difference in phase between the detection signals obtained from the reflections of the pair of light beams. The difference signal will be zero if the light amounts of the pair of the light beams are equal to each other when the pair of light beams irradiate the pair of clock bits. This occurs once for the respective pair of clock bits and may be detected to eliminate a clock.

However, the amounts of the reflections of the respective light beams might be equal to each other if the adjacent clock bit pairs are irradiated together when the intervals of the clock bit pairs are small. The detection of this state should be avoided.

For this purpose, the irradiation of the pair of light beams onto the pair of clock bits and the zero-crossing point of the difference signal should be detected.

To detect these, for example, a zero-crossing point of the difference signal within a period of time from the starting of the irradiation of the light beam ahead in phase onto the clock bit is detected. Alternatively detected is a zero-crossing point of the different signal during a period of time from the initiation of the irradiation of the light beam behind in phase onto the clock bit to the termination of the irradiation of the light beam ahead in phase onto the clock bit.

As described above, according to the present invention, not only tracking but also clock signal extraction for setting the reading/writing timing is attained by relatively moving the optical head, while tracing the clock track. Thus, both the tracking and the clock timing are achieved without incorporating a clock into a signal itself or without reducing the recording capacity.

BRIEF DESCRIPTION OF THE DRAWINGS

FIG. 2 is an optical path diagram of one form of optical system employable for reading/writing according to present embodiment;

FIG. 3 is a block diagram showing an example of circuits for extracting a tracking-error signal and clock signals;

DETAILED DESCRIPTION OF THE PREFERRED EMBODIMENT

Figure 1A:
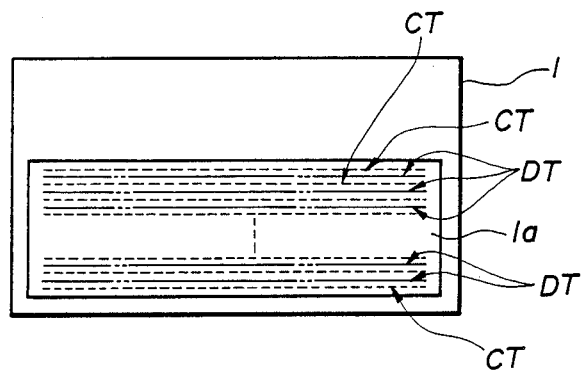
FIG. 1A is an explanatory plan view of a card-type optical recording medium to which a tracking method and apparatus according to an embodiment of the present invention may be applied.

A preferred embodiment of the present invention will now be described, while referring to the drawings.

Figure 1B:
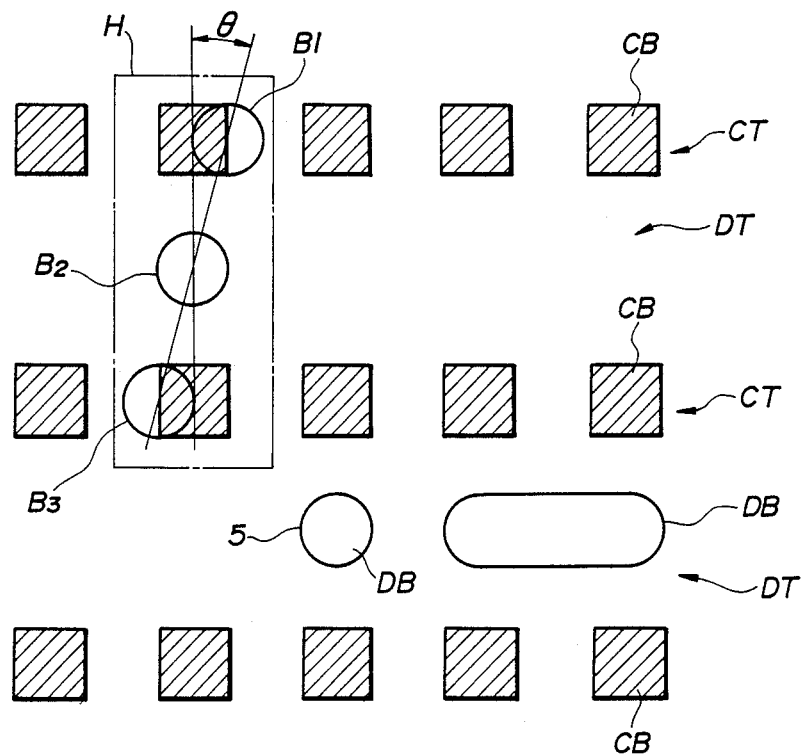
FIG. 1B is an enlarged plan view of a principal portion of the optical recording medium, schematically showing the operation of the embodiment.

FIG. 1B illustrates a configuration of one embodiment of the present invention. The FIGURE shows a part of a data recording region of an optical recording medium to which the present invention is applied in an enlarged scale. In the present embodiment, the medium is shown in the form of a card-type recording medium in which data are developed in the X - Y directions. However, the present invention may also be applicable to another form of recording medium.

The optical recording medium to which the present embodiment is applied is a card-type optical recording medium 1 having a data recording region 1a on a surface thereof, as illustrated in FIG. 1A. The data recording region 1a includes clock tracks CT extending along the length of the region and disposed at predetermined intervals. Data tracks DT are provided between any two adjacent clock tracks CT.

More specifically, as shown in FIG. 1B, the optical recording medium 1, to which the present embodiment is applied, has such a configuration that the data tracks DT are provided between any two adjacent clock tracks CT each comprising clock bits CB arranged in a row. This configuration allows an optical head to relatively move with respect to the medium while tracing the clock track CT for reading/writing data from/into the data track DT.

The clock bits CB may have any suitable shape, but they are formed in a square mark in the embodiment as illustrated. Each of the clock bits CB is formed in such a size that each side of the square is substantially equal to a diameter of a light beam as will be described later. The interval between the respective clock bits CB may be suitably set. In the present embodiment, the interval is set to be slightly longer than each side of the square mark. However, it may be selected to be equal to each side of the square mark or a bit shorter than the side.

The clock bit CB is formed by a mark which has a reflectivity lower than that of the remaining ground portion. Of course, the mark may be formed by providing a higher reflectivity. The clock bits CB are formed, for example, by printing such as photolithography, in the manufacturing process of the optical recording medium.

Data bits DB are formed in the data track DT. The data bits DB are written at positions corresponding to the clock bits CB, or in synchronism with the clock bits CB. The shape of the data bit DB depends upon a data encoding system. In the present embodiment, a circle represents one bit and it is elongated in a direction of the track to represent two or more bits. The data bit DB is formed by a mark which is lower in reflectivity than that of the remaining ground portion. Of course, the mark may have a higher reflectivity alternatively.

The present embodiment is applied to an optical recording medium, and according to this embodiment, an optical head H is relatively moved with respect to the medium, while tracing the clock track to read/write data from/into the data track DT.

More specifically, a pair of light beams B1 and B3 are irradiated onto a pair of clock tracks CT, between which a data track DT to be written is positioned, from the optical head H side, with the beams B1 and B3 so deviated from each other in a direction of a relative movement of the optical head with respect to the medium that beam detection signals may have a phase difference therebetween. Reflections of the respective light beams B1 and B3 from the clock tracks are detected and a difference signal between said reflections is obtained from the detection signals. A tracking-error signal is extracted from the difference signal by a bandpass filter and a zero-crossing point of the difference signal is detected when the difference signal varies in a direction determined depending upon the setting of the deviation to extract a clock signal.

The optical head H employable in the present embodiment provides three light beams B1, B2 and B3, These three light beams B1, B2 and B3 are so disposed that B2 may be projected onto the data track DT and the light beams B1 and B3 may be respectively projected onto the clock tracks CT between which is the data track DT to be subjected to reading/writing.

The light beams B1 and B3 are so deviated from each other in a direction of relative movement between the optical head and the medium that there may be caused a phase difference between detection signals for the beams. In the present embodiment, said pair of light beams B1 and B3 are irradiated in such a manner that a line extending between the centers of the respective beams may be inclined at an angle of 0 with respect to a line connecting said pair of clock bits to deviate from each other in the direction of the relative movement.

The light beams B1, B2 and B3 are formed by an optical system as illustrated in FIG. 2. This optical system comprise a light source 6 such as a semiconductor laser, a collimating lens 7 for rendering light radiated from the light source 6 be parallel, a diffraction grating 8 for splitting the light beam into a plurality of (three in the present embodiment) of beams, a beam splitter 9 for dividing the transmitted light from the reflected light, a quarter-wave plate 10 for letting polarization planes of incident light upon the optical recording medium and reflected light be intersected with each other, an objective lens 11, an ocular lens 12 for letting the reflected light from the optical recording medium 1 form an image on a photodetector P, a beam splitter 13 for branching a part of light beam to the ocular lens 12, and an autofocusing device 14 for effecting focusing by the branched light beam.

The optical system employable in the present embodiment may be different from that as shown in FIG. 2. For example, an off-center type optical system may alternatively be employed.

The photodetector P comprises, for example, three PIN photodiodes formed on a single substrate. P2 is for reading and P1 and P3 arranged on the opposite sides of P2 are for tracking. The reading photodetector P2 is connected to a reading circuit not shown. The tracking photodetectors P1 and P3 are connected, at the respective outputs thereof, to a circuit as shown in FIG. 3. A focusing detector (not shown) is provided in the autofocusing device.

The optical system as described above may be used in common for both reading and writing. In writing, the output energy of the light source 6 is increased so that the portions irradiated by the light beam B2 may be change physically or chemically to cause optical changes for writing data. On the other hand, in reading, the output energy is reduced to form a light spot for reading the optical change preliminarily formed at the spot irradiated portion as information provided by the reflected light, without causing any physical or chemical changes at portions where the light beam B2 is irradiated.

In this connection, it is to be noted that since the intensities of the light beams B1 and B3 are so selected as to be 1/10 or less than that of the light beam B2, the physical or chemical change at portions irradiated by the light beams B1 and B3 may be neglected even at the time of writing.

The tracking and clock as referred to above are attained by a tracking signal/clock signal generating circuit as illustrated in FIG. 3.

The tracking signal/clock signal generating circuit as illustrated in FIG. 3 comprises amplifiers 15, 16 for amplifying the outputs from the tracking photodetectors P1, P3 of the photodetector P, a differential amplifier 17 for subjecting these outputs to differential amplification to obtain a difference signal, a bandpass filter 18 which removes unnecessary frequency components from the difference signal to extract a tracking-error signal, and a clock signal extracting circuit 19 for extracting a clock signal from the difference signal.

Figure 4:
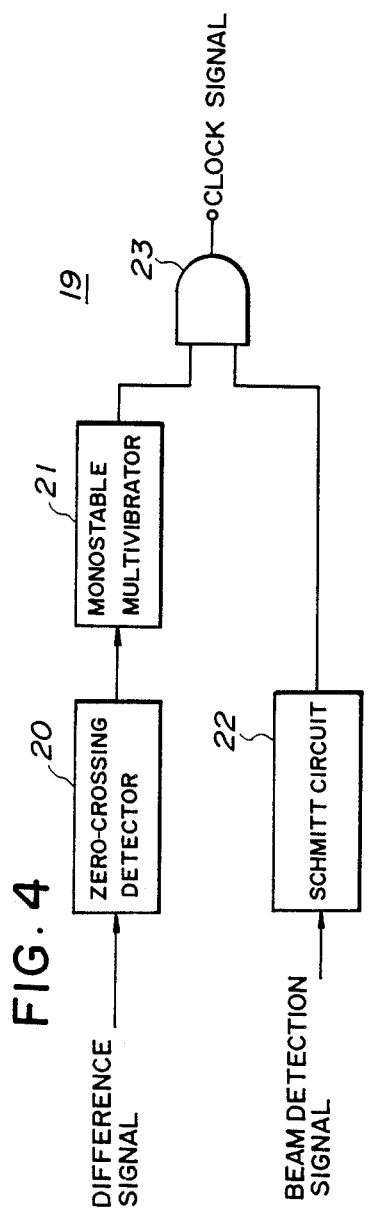
FIG. 4 is a block diagram of the clock signal extracting circuit in the circuit arrangement shown in FIG. 3.

The clock signal extracting circuit 19 is formed, as illustrated in FIG. 4, of a zero-crossing detector 20 for detecting a zero-crossing point from the difference signal, a monostable multivibrator 21 for forming a clock pulse by using a zero-crossing detection signal as a trigger, Schmitt circuit 22 for generating a gate signal from a waveform signal output from the tracking photodetector P1, and an AND gate 23 for letting the clock pulse output from the monostable multivibrator 21 and the gate signal output from the Schmitt circuit 22 to AND.

The operation of the present embodiment as described above will now be described, referring to its data writing operation.

The optical head H is first placed at a position corresponding to the data track DT of the optical recording medium, which is to be subjected to the data writing operation, i.e. above or under the data track DT. More specifically, the light beams B1 and B3 are put onto the clock tracks CT, respectively, which are on the opposite sides of the data track DT to be written. With this arrangement, the optical head H is moved in a direction of the data track DT.

The light beams B1 and B3 are formed together with the light beam B2 by the optical system as described above. As shown in FIG. 1B, the light beams irradiated onto the clock track CT are reflected therefrom and the reflection is incident upon the tracking photodetectors P1 and P3 of the photodetector P through the objective lens 11, the quarter-wave plate 10, the beam splitter 9 and the ocular lens 12.

Figure 5:
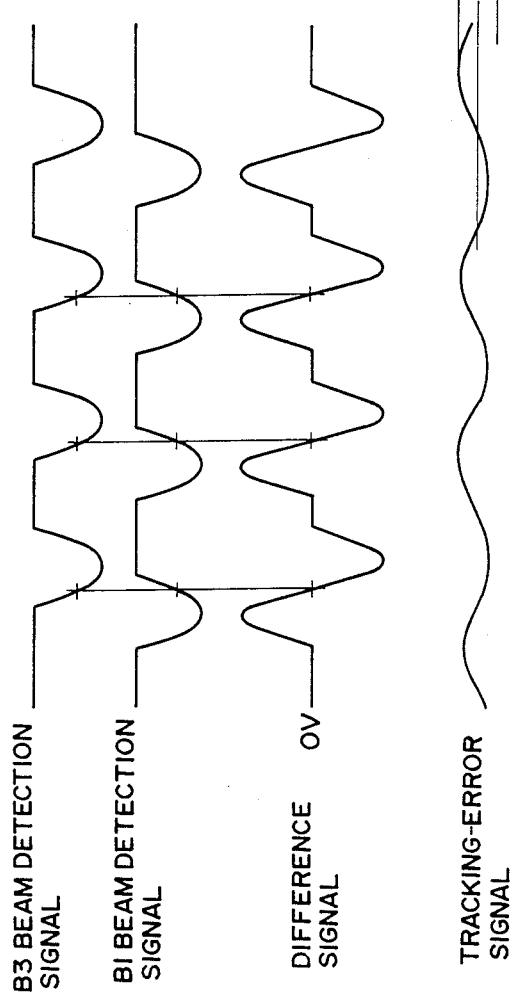
FIG. 5 is a wave-form diagram showing the operation of the present embodiment.

The reflection incident upon the photodetectors P1, P3 causes photo-currents according to light amounts received by the photodetectors. More specifically, the reflection will decrease its light amount as the rate of the clock mark, which is lower in reflectivity, in an image of the beam is increased, since the brightness of the reflection plane is lowered. The rate of the clock mark included in the image is varied with the movement of the optical head. On the other hand, the light amount will vary with the movement of the optical head and a locus of the variation will be pulsed. Since the light amounts will also vary with respect to other serial clock bits, such a pulsed change will appear periodically. Therefore, the outputs from the optical detectors P1, P3 will appear as waveforms shown as B1 and B3 beam detection signals in FIG. 5.

The waveforms of the B1 and B3 beam detection signals lags in phase because the beams are irradiated while being deviated from each other in the relative movement direction. More particularly, the phase of the B1 beam detection signal is ahead of the phase of the B3 beam detection signal.

The outputs from the optical detectors P1 and P3 are amplified by the amplifiers 15 and 16, respectively, and input to the differential amplifier 17 to be output therefrom as a difference signal. This difference signal is fed to the bandpass filter 18 and the clock signal extracting circuit 19.

The bandpass filter 18 extracts a tracking-error signal. A the pulsed waveforms of the B1 and B3 beam detection signals contain some frequency components due to their discontinuity, a frequency component due to a tracking error will be extracted therefrom. This tracking-error signal varies depending upon a deviation in tracking. Normal tracking may be attained by controlling so that the deviation in the tracking may be cancelled. In other words, a tracking-error signal is used as a servo signal for a servo system.

In the clock signal generating circuit 19, a gate signal is generated from the B1 beam detection signal by the Schmitt circuit 22. This gate signal is output during a period corresponding to a duration from a leading to trailing edge of the B1 beam detection signal.

The clock signal generating circuit 19 also detects a zero-crossing point of the difference signal by the zero-crossing detector 20. The zero-crossing point detection output triggers the monostable multivibrator 21 to output a clock pulse.

The zero-crossing point will occur at either of the leading and trailing of the difference signal. However, the present embodiment employs, as a reference for a clock, a position in which average brightnesses of the B1 beam and the B3 beam are equal to each other and the B2 beam is located on a line connecting the relevant pair of clock bits when the B1 beam is midway from the lowest-brightness state to the highest-brightness state, while the B3 beam being midway from the highest-brightness state to the lowest-brightness state as shown in FIG. 1B. For this purpose, the clock pulse from the monostable multivibrator 21 and the gate signal from the Schmitt circuit 22 are subjected to AND by the AND gate circuit 23 to output a clock signal based only on said position.

This clock signal is used as a reference for data writing by the optical system. More specifically, when the clock signal is output, the output from the light source 6 of the optical system is increased by a control circuit (not shown). This enables the B2 beam irradiated through the objective lens 11 to melt a surface of the optical recording medium by an intensified light energy to form a pit 5. The pit 5 lowers the reflectivity so that it works as a data bit DB.

An operation of the present embodiment in the reading is substantially the same as that as described above for the data writing, with respect to the tracking and the clock formation. In reading, the reflection of the B2 beam is split by the beam splitter 9 and received by the photodetector P2. A portion of the reflection is received by the autofocusing apparatus 14 through the beam splitter 13 to adjust focusing.

The photodetector P2 detects a light amount of the B2 beam or a brightness of a reflection plane of the B2 beam from the data track DT, by using the clock signal as a sampling signal. A reader apparatus (not shown) discriminates whether the data bit DB is formed at the relevant position or not on the basis of the magnitude of the photo-output. Thus, binary signs of the digital data are read out.

According to the present embodiment, as described above, the clock track is used to effect tracking and take out a clock signal. This enables both tracking and generation of a clock without providing both the tracking line and the clock track. Moreover, since a clock signal is obtained, there is no nee to incorporate a clock signal into data itself in either data writing or data reading. Thus, it can be obviated that the circuit arrangement associated with clocking in the reader/writer apparatus becomes complicated.

In this connection, it is to be noted that the present invention is not limited to the embodiment as described and various changes an modifications thereof may be possible. For example, the present invention is applied to an optical recording medium which has a round clock bit.

I claim:

1. A tracking method for reading/writing data with respect to an optical recording medium having clock tracks each formed of clock bits of optical patterns and data tracks, which method comprises:
  irradiating a pair of light beams onto a pair of clock tracks, between which a data track to be written/read is positioned, from an optical head side, with the beams so deviated from each other in a direction of relative movement of the optical head with respect to the medium that beam detection signals produced by a light detector means in response respectively to light reflections of the pair of light beams from the clock tracks may have a phase difference therebetween;
  using said detector means, detecting reflections of the respective light beams from the clock tracks to obtain a pair of detection signals;
  obtaining a difference signal corresponding to a difference between said detection signals;

extracting a tracking-error signal from the difference signal; and detecting a zero-crossing point of the difference signal to extract a clock signal.

2. A tracking method as claimed in claim 1, wherein said pair of light beams is irradiated in such a manner that a line connecting the centers of the beams may be skewed with respect to a line connecting a pair of said clock bits to deviate the positions of the light beams from each other in the relative movement direction for causing a phase difference in the detection signals.

3. A tracking method as claimed in claim 1, wherein said difference signal is obtained from said detector means in accordance with a difference in amounts of the reflections from said pair of clock bits irradiated by said pair of light beams.

4. A tracking method as claimed in claim 3, wherein said tracking-error signal corresponds to said difference in amounts and a relative positional relationship between the optical head and the optical recording medium and said positional relationships is adjusted to make said tracking-error signal zero for correcting the tracking error.

5. A tracking method as claimed in any one of claim 1, wherein said zero-crossing point of the difference signal is detected within a predetermined period of time from irradiation of the light beam ahead in phase onto the clock bit.

6. A tracking method as claimed in any one of claim 1, wherein said zero-crossing point of the difference signal is detected during a period of time between a time when the light beam behind in phase begins irradiation onto the clock bit and a time when the light beam ahead in phase terminates irradiation of the clock bit.

7. A tracking apparatus for reading/writing data with respect to an optical recording medium having clock tracks each formed of clock bits of optical patterns and data tracks, which apparatus comprises:

an optical head including an optical system for irradiating a pair of light beams onto a pair of clock tracks, between which a data track to be written/-read is positioned, from an optical head side, with the beams so deviated from each other in a direction of a relative movement of the optical head with respect to the medium that beam detection signals may have a phase difference therebetween and detecting reflections of the respective light beams from the clock tracks; and a photodetector for converting the reflections into electric signals to obtain detection signals;

a difference signal detecting circuit for obtaining difference between said reflections from said detection signal difference signal corresponding to a a tracking-error signal extracting circuit for extracting a tracking-error signal from the difference signal; and a clock-signal extracting signal which detects a zero-crossing point of the difference signal to extract a clock signal.

8. A tracking method as claimed in claim 7, wherein said pair of light beams is irradiated in such a manner that a line connecting the centers of the beams may be skewed with respect to a line connecting a pair of said clock bits to deviate the positions of the light beams from each other in the relative movement direction for causing a phase difference in the detection signals.

9. A tracking apparatus as claimed in claim 7, wherein said tracking-error signal extracting circuit is formed of a bandpass filter.

10. A tracking apparatus as claimed in claim 7, wherein said clock signal generating circuit comprises a zero-crossing detector for detecting a zero-crossing point from the difference signal; a pulse shaping circuit for shaping a clock pulse by using a zero-crossing point detection signal as a trigger; a gate signal shaping circuit for shaping a gate signal from either one of the detection signals corresponding to said pair of light beams which are output from the photodetectors; and an AND gate circuit through which AND of the clock pulse and the gate signal is obtained.

* * * * *